United States Patent [19]

Robertson

[11] Patent Number: 4,832,275
[45] Date of Patent: May 23, 1989

[54] FILM CASSETTE

[75] Inventor: Jeffrey C. Robertson, Rochester, N.Y.

[73] Assignee: Eastman Kodak Company, Rochester, N.Y.

[21] Appl. No.: 196,420

[22] Filed: May 19, 1988

[51] Int. Cl.⁴ .............................................. G03B 17/26
[52] U.S. Cl. ..................................... 242/71.1; 354/275
[58] Field of Search ................................ 242/71–71.1; 354/275

[56] References Cited

U.S. PATENT DOCUMENTS

| | | | |
|---|---|---|---|
| 988,341 | 4/1911 | Hill | 242/71.1 |
| 2,541,476 | 2/1951 | Mihalyi | 242/71.1 |
| 3,234,024 | 2/1966 | Leinonen | 242/71.1 |
| 3,659,799 | 5/1972 | Cerutti et al. | 242/71.1 |
| 3,677,499 | 7/1972 | Wangerin | 242/71.1 |
| 3,797,777 | 3/1974 | Hosono et al. | 242/71.1 |
| 4,311,377 | 1/1982 | Matteson | 354/275 X |
| 4,407,579 | 10/1983 | Huff | 354/275 |
| 4,423,943 | 1/1984 | Gold | 354/275 |

Primary Examiner—Stuart S. Levy
Assistant Examiner—Steven M. duBois
Attorney, Agent, or Firm—Roger A. Fields

[57] ABSTRACT

A film cassette is disclosed wherein a film spool is rotatable about an axis within the cassette shell, successive sections of the outermost convolution of a film roll wound on the film spool are automatically advanced to the outside of the cassette shell in response to rotation of the film spool, and a pair of rigid constraining rings radially confine the outermost convolution to prevent the film roll from clock-springing against an interior wall of the cassette shell. The constraining rings are supported along the interior wall for rotation about separate axes inclined with respect to the spool axis to position the rings to partially encircle the outermost convolution, to radially confine the outermost convolution, and to position relatively small opposite corresponding portions of the rings apart a distance greater than the width of the outermost convolution, to allow successive sections of the outermost convolution to exit the radial confinement of the rings when the film spool is rotated.

6 Claims, 4 Drawing Sheets

FILM CASSETTE

CROSS-REFERENCE TO A RELATED APPLICATION

Reference is made to commonly assigned copending U.S. aplication Ser. No. 173,396, entitled FILM CASSETTE, and filed Mar. 25, 1988 in the names of Jeffrey C. Robertson and Mark D. Fraser.

BACKGROUND OF THE INVENTION

1. Field of the Invention

The invention relates generally to the field of photography and particularly to a film cassette containing roll film.

2. Description of the Prior Art

In conventional 35 mm film manufacturers' cassettes, such as manufactured by Eastman Kodak Co. and Fuji Photo Film Co., Ltd., the filmstrip is wound on a flanged spool which is rotatably supported within a cylindrical shell. A leading end section of the filmstrip approximately 2⅜ inches long, commonly referred to as a "film leader", protrudes from as light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader section protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary to engage the protruding leader section to draw the filmstrip out of the shell. However, in the event the leader section is back wound into the shell, it cannot readily be retrieved.

A 35 mm film cassette has been proposed which, unlike conventional film cassettes, includes a film leader that normally does not extend outside the cassette shell. The leader, instead, is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During initial unwinding rotation of the film spool, the leading end of the filmstrip is advanced to and through a film passageway opening in order to exit the cassette shell. The opening has a width which is slightly less than the width of the filmstrip, thus resulting in the filmstrip being transversely bowed as it is uncoiled from the film spool, and thereby facilitating movement of the film edges under the circumferential lips of the respective flanges. However, transverse bowing of the filmstrip to move its edges under the circumferential lips results in increased friction between the filmstrip and the cassette structure which will impede advance of the filmstrip from the cassette shell and may damage the filmstrip.

3. The Cross-Referenced Application

Like the type of film cassette disclosed in U.S. Pat. No. 4,423,923, the cross-referenced application discloses a film cassette that contains a non-protruding film leader which is automatically advanced to the outside of the cassette shell in response to initial rotation of the film spool in the unwinding direction.

Specifically, there is disclosed a film cassette wherein a convoluted film roll is wound on a spool between a pair of coaxially spaced, independently rotatable flanges. The two flanges have respective circumferential annular lips which prevent the outermost convolution of the film roll from clock-springing into contact with the cassette shell. When the spool is initially rotated, the flanges may remain substantially stationary and the film roll, since its inner end is secured to the spool, tends to expand radially to ensure a non-slipping relation between the outermost convolution and the annular lips. Once the non-slipping relation exists, rotation of the spool will rotate the flanges. This allows stationary internal spreaders to deflect relatively small successive portions of the annular lips to an axial dimension exceeding the film width, in turn allowing corresponding sections of the outermost convolution to exit the radial confinement of the lips without damaging the filmstrip, and to advance to the outside of the cassette shell.

SUMMARY OF THE INVENTION

While the film cassette disclosed in the cross-referenced application avoids the possibility of damaging the filmstrip as compared to the film cassette disclosed in U.S. Pat. No. 4,423,932, it is necessary in the first-mentioned cassette to flex the annular lips which constrain the outermost convolution of the film roll to allow successive sections of the outermost convolution to exit the radial confinement of the annular lips. The invention advantageously solves this problem by removing the need to flex the annular lips to allow exit of the outermost convolution.

According to the invention, there is provided an improved film cassette wherein (a) a film spool is rotatable about an axis within a cassette shell, (b) successive sections of the outermost convolution of a film roll wound on the film spool are advanced to the outside of the cassette shell in response to rotation of the film spool, and (c) constraining means for radially confining the outermost convolution to prevent the film roll from clock-springing against an interior wall of the cassette shell is rotatable with the film spool to facilitate the advancement of successive sections of the outermost convolution to the outside of the cassette shell, and wherein the improvement comprises:

said constraining means includes a pair of annular members for radially confining the outermost convolution of the film roll; and positioning means supports the annular members for rotation about separate axes inclined with respect to the spool axis to position opposite corresponding portions of the annular members apart a distance greater than the width of the outermost convolution, to allow successive sections of the outermost convolution to exit the radial confinement of the annular members when the film spool is rotated.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating direclty with the disclosed embodiment. It is to be understood, however, that other elements not specifically shown or described may take various forms known to persons of ordinary skill in the art.

Figure 1:
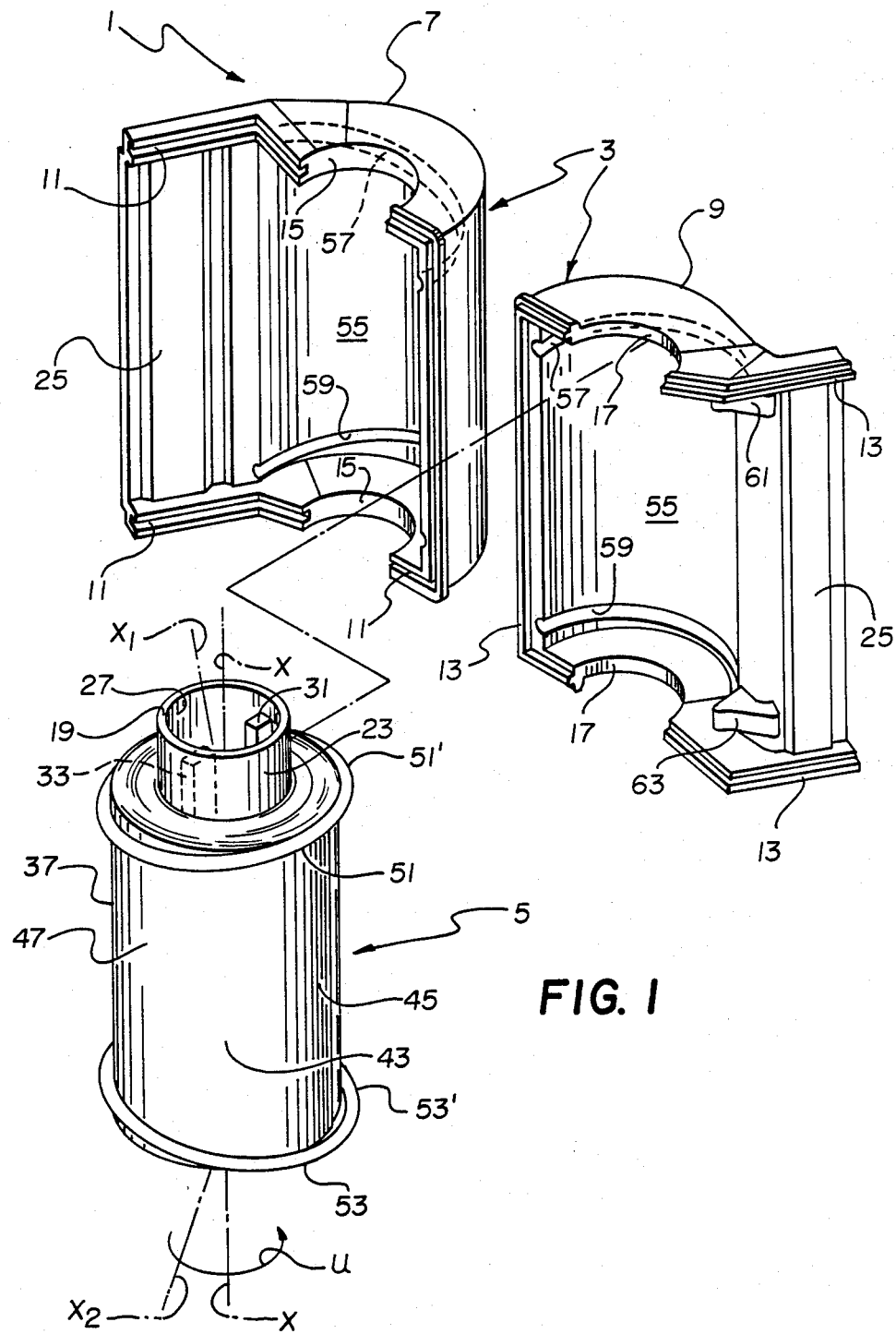
FIG. 1 is an exploded perspective view of an improved film cassette according to a preferred embodiment of the invention.
Figure 2:
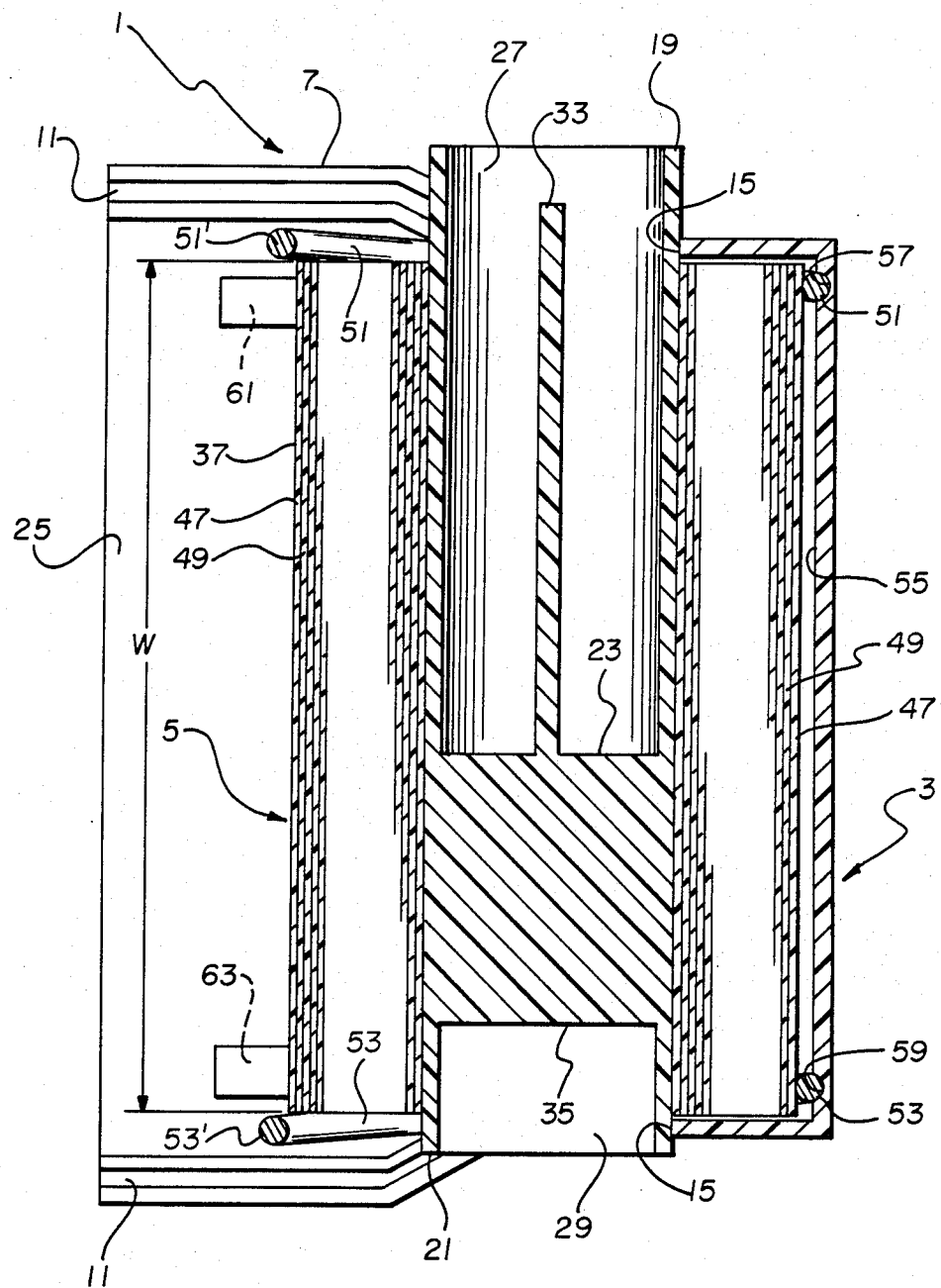
FIG. 2 is an elevation view in cross-section of the improved film cassette.
Figure 3:
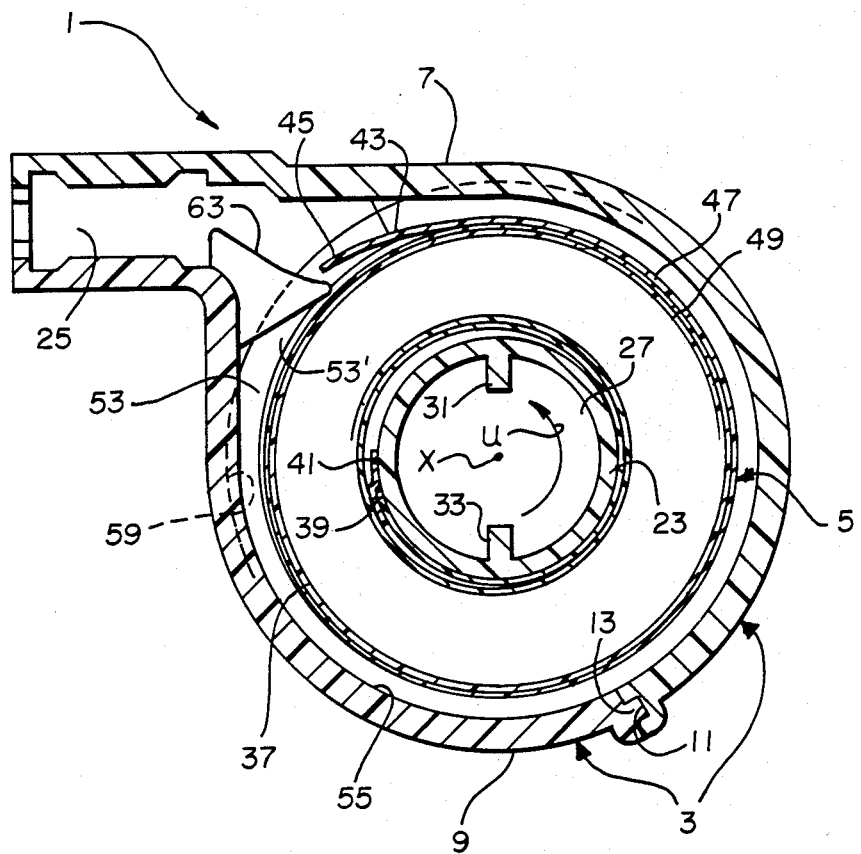
FIG. 3 is an end view in cross-section of the improved film cassette.

Referring now to the drawings, FIGS. 1–3 depict an improved 35 mm film cassette 1 comprising a light-tight cassette shell 3 and a film spool 5 which is rotatable about an axis X within the cassette shell. The cassette shell 3 consists of two shell halves 7 and 9 which are mated along respective grooved and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit. Suitable flanges or other means, not shown, may be formed on the opposite end extensions 19 and 21 of the spool core 23 to prevent ambient light from entering the openings 15 and 17 in the cassette halves 7 and 9.

The spool core 23 as shown in FIGS. 1–3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33 and 35 according to custom may be engaged to rotate the film spool in an unwinding direction indicated by the arrow U in FIG. 1, or to rotate the spool in a winding direction opposite to the unwinding direction.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2–3 convolutions of the film roll 37. One of these leader convolutions is the outermost convolution 47 and another of them is the next inward succeeding convolution 49.

As shown in FIGS. 1 and 2, a pair of indentical annular members, preferably rigid constraining rings 51 and 53, are arranged to radially confine the outermost convolution 47 of the film roll 37 to prevent the film roll from radially expanding or clock-springing into contact with an interior wall 55 of the cassette shell 3. The constraining rings 51 and 53 are nested within respective guide grooves 57 and 59 formed in the interior wall 55 of the cassette shell 3. The guide grooves 57 and 59 support the constraining rings 51 and 53 for rotation independently of the spool core 23 about separate axes $X_1$ and $X_2$ inclined with respect to the spool axis X as shown in FIG. 1. This arrangement positions the constraining rings 51 and 53 to partially encircle the outermost convolution 47, to radially confine the outermost convolution, and to position relatively small opposite corresponding portions 51' and 53' of the rings apart a distance greater than the width W of the outermost convolution, to allow the leading end 45 and successive sections of the outermost convolution 47 to exit the radial confinement of the rings when the spool core 23 is rotated in the unwinding direction U. As can be seen in FIG. 2, the ring portions 51' and 53' are located nearby the film passage slit 25.

OPERATION

When the spool core 23 is initially rotated about its axis X in the unwinding direction U, the two constraining rings 51 and 53 may remain substantially stationary and the film roll 37, since its inner end 39 is attached to the spool core, tends to expand radially or clock-spring to ensure a non-slipping relation between the outermost convolution 47 of the film roll and the constraining rings. Then, continued rotation of the spool core 23 in the unwinding direction U about its axis X will rotate the constraining rings 51 and 53 in the same direction about their inclined axes $X_1$ and $X_2$. As can be appreciated from FIGS. 2 and 3, the leading end 45 of the film roll 37 can exit the radial confinement of the constraining rings 51 and 53 only in the vicinity of the ring portions 51' and 53', because these portions are spaced apart a distance W which is greater than the film width. Such exiting is facilitated by a pair of stripper-guide surfaces 61 and 63 fixed to the shell half 9 at the entrance to the film passage slit 25. The stripper-guide surfaces 61 and 63 serve to direct the leading end 45 into the film passage slit 25, thereby permitting successive sections of the outermost convolution 47 to exit the radial confinement of the constraining rings 51 and 53 at the ring portions 51' and 53'. Of course, it will be realized that the ring portions 51' and 53' continually are replaced by succeeding portions (similarly spaced apart) as the constraining rings 51 and 53 are rotated with the spool core 23. Thus, continued rotation of the spool core 23 will thrust the film leader 43 from the inside to the outside of the cassette shell 3.

The invention has been described with reference to a preferred embodiment. However, it will be appreciated that variations and modifications can be effected within the ordinary skill in the art without departing from the scope of the invention. For example, the leading end 45 of the film roll 37 could initially be located within the film passage slit 25 or could protrude very slightly from the slit, instead of as shown in FIG. 1. Also, instead of the guide grooves 57 and 59, other suitable support means such as rails could be employed to support the constraining rings 51 and 53 for rotation about their inclined axes $X_1$ and $X_2$.

I claim:

1. An improved film cassette wherein (a) a film spool is rotatable about an axis within a cassette shell, (b) successive sections of the outermost convolution of a film roll wound on said film spool are advanced to the outside of said cassette shell in response to rotation of the film spool, and (c) constraining means for radially confining said outermost convolution to prevent said film roll from clock-springing against an interior wall of said cassette shell is rotatable with said film spool to facilitate the advancement of successive sections of the outermost convolution to the outside of the cassette shell, and wherein the improvement comprises:

said constraining means includes a pair of annular members for radially confining said outermost convolution of the film roll; and positioning means supports said annular members for rotation about separate axes inclined with respect to the spools axis to position opposite corresponding portions of the annular members apart a distance greater than the width of said outermost convolution, to allow successive sections of the outermost convolution to exit the radial confinement of said annular members when said film spool is rotated.

2. The improvement as recited in claim 1, wherein said positioning means includes respective supporting means fixed to said interior wall of the cassette shell for supporting said annular members to rotate about said inclined axes.

3. The improvement as recited in claim 1, wherein said annular members are respective constraining rings and said positioning means supports said constraining rings inclined with respect to each other.

4. An improved film cassette wherein (a) a film spool is rotatable about an axis within a cassette shell, (b) successive sections of the outermost convolution of a film roll wound on said film spool are advanced to the outside of said cassette shell in response to rotation of the film spool, and (c) constraining means for radially confining said outermost convolution to prevent said film roll from clock-springing against an interior wall of said cassette shell is rotatable with said film spool to facilitate the advancement of successive sections of the outermost convolution to the outside of the cassette shell, and wherein the improvement comprises:

said constraining means includes a pair of rigid constraining rings rotatable independently of said film spool; and positioning means supports said constraining rings for rotation about separate axes inclined with respect to the spool axis to position the constraining rings to partially encircle said outermost convolution, to radially confine the outermost convolution, and to position relatively small opposite corresponding portions of said constraining rings apart a distance greater than the width of said outermost convolution, to allow successive sections of the outermost convolution to exit the radial confinement of said constraining rings when said film spool is rotated.

5. The improvement as recited in claim 4, wherein said positioning means includes respective guide grooves formed in said interior wall of the cassette shell to support said rigid constraining rings to rotate about said inclined axes.

6. The improvement as recited in claim 4, wherein said film cassette has a film passage slit through which successive sections of said outermost convolution of the film roll are advanced to the outside of said cassette shell, and wherein said positioning means supports said constraining rings to locate their corresponding portions positioned apart a distance greater than the width of the outermost convolution proximate said film passage slit.

* * * * *